United States Patent [19]
Howard

[11] Patent Number: 5,950,218
[45] Date of Patent: Sep. 7, 1999

[54] METHOD AND SYSTEM FOR STORAGE AND RETRIEVAL OF DATA ON A TAPE MEDIUM

[75] Inventor: David Howard, Guildford, United Kingdom

[73] Assignee: Storage Technology Corporation, Louisville, Colo.

[21] Appl. No.: 08/743,526

[22] Filed: Nov. 4, 1996

[51] Int. Cl.[6] .................................................. G06F 12/02
[52] U.S. Cl. .............................. 711/4; 711/162; 707/204
[58] Field of Search ............................... 711/4, 147, 162, 711/169; 707/204, 101, 102, 103, 205; 395/674, 306

[56] References Cited

U.S. PATENT DOCUMENTS

| | | |
|---|---|---|
| 4,761,778 | 8/1988 | Hui . |
| 4,949,245 | 8/1990 | Martin et al. . |
| 4,964,037 | 10/1990 | Woods et al. . |
| 5,212,772 | 5/1993 | Masters ............................... 395/182.18 |
| 5,274,772 | 12/1993 | Dunn et al. ............................. 395/831 |
| 5,673,381 | 9/1997 | Huai et al. ............................... 395/180 |

OTHER PUBLICATIONS

StorageTek®, REELlbackup™, *REELbackup User's Guide*, Copyright 1992–1993.

*Primary Examiner*—Eddie P. Chan
*Assistant Examiner*—Hiep T. Nguyen
*Attorney, Agent, or Firm*—Brooks & Kushman P.C.

[57] ABSTRACT

A method is provided for interfacing with a storage device having a tape medium. The method includes receiving data from a first source, and creating a first data packet having at least a portion of the data from the first source. The method also includes receiving data from a second source, and creating a second data packet having at least a portion of the data from the second source. The method further includes receiving additional data from the first source, and creating a third data packet having at least a portion of the additional data from the first source. The method still further includes transmitting the first data packet, the second data packet and the third data packet to the storage device, and storing the first data packet, the second data packet, and the third data packet on the tape medium in an interleaved configuration. A system including control logic is also provided for performing the method.

18 Claims, 3 Drawing Sheets

METHOD AND SYSTEM FOR STORAGE AND RETRIEVAL OF DATA ON A TAPE MEDIUM

TECHNICAL FIELD

This invention relates to a method and system for storage and retrieval of data on a tape medium.

BACKGROUND ART

Although disk subsystems are becoming increasingly resistant to hardware failures, regular system backups are still necessary since such failures are only one reason for performing storage and/or recovery of data. Unfortunately, backups can contribute to a large percentage of the time of a traditional batch window. Moreover, while the backup process is simple and well defined, it often requires a large amount of resources from input/output (I/O) subsystems.

In IBM MVS systems, such backups are traditionally stored on a tape medium. With the ever increasing amount of disk space and the ever decreasing size of batch windows, there is a need to be able to maximize the throughput of tape subsystems in order to move large quantities of data from disk to tape in an ever decreasing time frame.

This need can be at least partially met by using more high speed tape storage devices. However, this then creates a problem concerning management of the sheer number of tape cartridges that result. For example, to backup 1TB of data onto traditional high speed tapes requires about 500 cartridges, assuming 100% usage of all cartridges.

Recently, however, tape subsystems have been developed having markedly improved capacity. For example, the StorageTek REDWOOD device has a capacity 50 times that of prior tape subsystems, and two to four times that of a single disk storage device. It is thus capable of storing the above data on just 10 cartridges. Significantly, the StorageTek REDWOOD tape subsystem is also capable of transferring data at around 12 MB per second, while disk subsystems are capable of transferring data at around 4.5 MB per second per device (physical or logical).

Given the increased speed and capacity of such a tape subsystem, a need now exists for an easy and efficient method and system for storing data onto such a subsystem. Once the data has been placed on tape, there is also a need to reduce the physical and logical management of the data.

Current methods and systems for storing data on tape in an IBM MVS system, however, provide little ability to manage the placement and organization of the data and/or the medium. Such methods and systems involve changing the JCL for the backups to form them into fixed streams that stack the individual backups onto the media by specifying a physical position for the data on a tape volume. However, the data files must be written in sequence and further processing is required to move the data from either a disk buffer or from the original tape volume, making such methods and systems difficult to manage.

Thus, such methods and systems are incapable of direct storage and retrieval of data to and from a tape medium. This is particularly true where the data source is an application program or a system utility. Similarly, tape storage methods and systems for use in other operating systems (e.g., UNIX) are incapable of interfacing with application programs and/or system utilities.

Still further, IBM MVS based methods and systems for data storage on tape also fail to overcome the large disparity in data transfer rates between current disk devices and the tape device discussed above. In that regard, the data management principals employed dictate that one disk device is backed up to one tape device. Individual streams used are therefore only able to deliver about 25% of the performance of which the StorageTek REDWOOD tape subsystem is capable. As a result, the improved data movement capacity is vastly oversubscribed in relation to the throughput requirements of existing disk subsystems.

In short, the increased speed and capacity of the recently developed tape subsystem described above are capable of reducing processing times for backups as well as the physical media requirements for storing the data. At present, however, this capability can only be partially met by vast overcapacity of the tape systems and difficult job management.

As a result, there exists a need for a method and system capable of exploiting the increased speed and capacity of recently developed tape subsystems. Such a method and system would solve the problems discussed above by providing an extra level of data management when accessing tape. In contrast to the prior art, such a method and system would also be capable of interfacing with application programs and/or system utilities to provide direct storage and retrieval of data from such programs and/or utilities to and from a tape medium.

SUMMARY OF THE INVENTION

Accordingly, it is an object of the present invention to provide a general purpose method for interfacing with a storage device having a tape medium.

Another object of the present invention is to provide a system for storage of data to a storage device having a tape medium.

According to the present invention, then, a general purpose method is provided for interfacing with a storage device having a tape medium. The method of the present invention comprises receiving data from a first source, and creating a first data packet comprising at least a portion of the data from the first source. The method also comprises receiving data from a second source, and creating a second data packet comprising at least a portion of the data from the second source. The method further comprises receiving additional data from the first source, and creating a third data packet comprising at least a portion of the additional data from the first source. The method still further comprises transmitting the first data packet, the second data packet, and the third data packet to the storage device, and storing the first data packet, the second data packet and the third data packet on the tape medium in an interleaved configuration.

The system of the present invention for data storage comprises a storage device having a tape medium, and control logic. The control logic is operative to receive data from a first source and create a first data packet comprising at least a portion of the data from the first source, receive data from a second source and create a second data packet comprising at least a portion of the data from the second source, and receive additional data from the first source and create a third data packet comprising at least a portion of the additional data from the first source. The control logic is further operative to transmit the data packets to the storage device, and store the data packets on the tape medium in an interleaved configuration.

These and other objects, features, and advantages will be readily apparent upon consideration of the following detailed description in conjunction with the accompanying drawings.

BEST MODE(S) FOR CARRYING OUT THE INVENTION

With reference to FIGS. 1–4, the preferred embodiment of the method and system of the present invention will now be described. In that regard, it should be noted that the preferred embodiment of the present invention has been designed for use with an IBM MVS system. However, as will be readily apparent to those of ordinary skill in the art, the method and system of the present invention are suitable for use in any system where efficient storage and/or retrieval of data to and/or from a tape subsystem are desired.

In general, the method and system of the present invention permit the increased speed and capacity of the recently developed StorageTek REDWOOD tape subsystem described above to be fully exploited simultaneously. As a result, the software for use in the present invention will be referred to herein as the Virtual Redwood Exploiter (VRE).

The VRE software addresses the problems discussed above through the use of software intercepts that allow it to sit between the application program or system utility and the tape device in order to manage data I/O. As a result, those of ordinary skill in the art will appreciate that the VRE software is particularly suitable for use with disk backup utilities, thereby providing for general backup operations from disk subsystems. Indeed, the ability to manage the placement and stacking of data onto tape is particularly beneficial for backups that need to be moved offsite.

Figure 1:
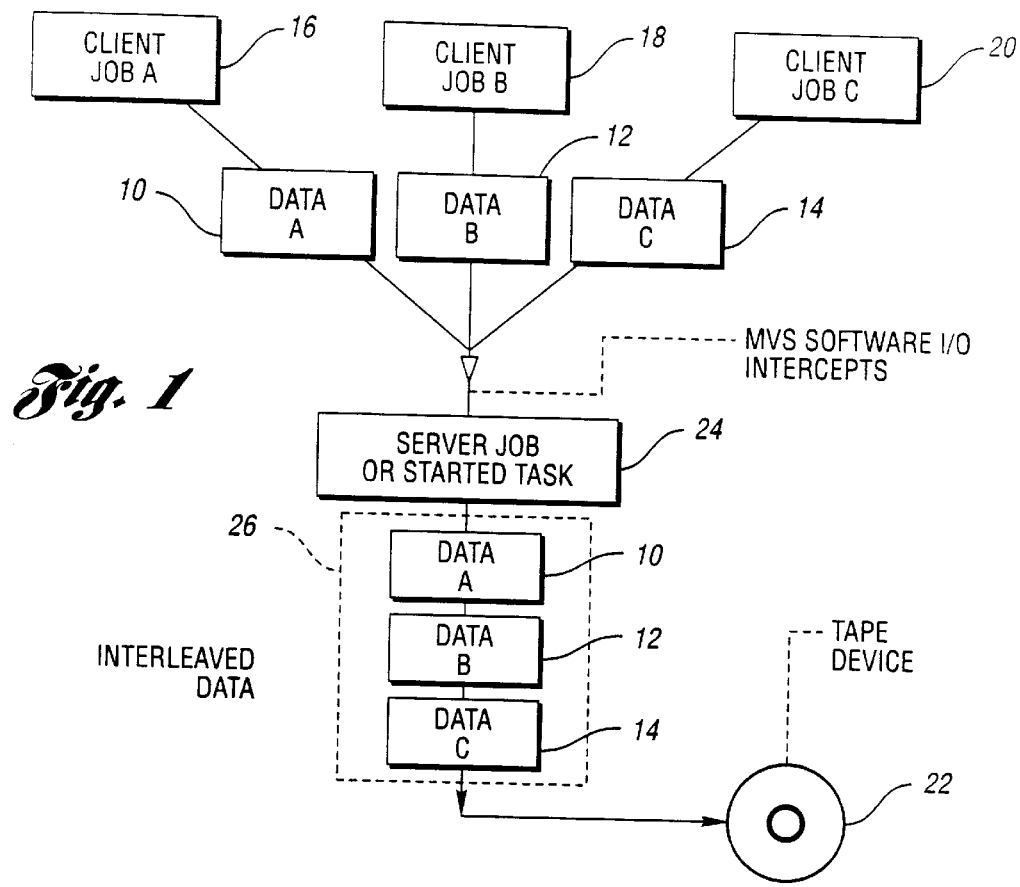
FIG. 1 is a simplified block diagram of the system of the present invention.

Referring now to FIG. 1, a simplified block diagram of the system of the present invention is shown. As seen therein, the present invention provides for storage of data blocks (10, 12, 14) from multiple client jobs (16, 18, 20) on a tape device (22) via a server job or started task (24). It should be noted that tape device (22) is preferably a StorageTek REDWOOD device having the data transfer and storage capabilities previously described, although other tape devices may be used.

FIG. 1 illustrates a major difference in operation between the present invention and tradition tape access, namely, true concurrent access to the tape device (22). To achieve this, the data (10, 12, 14) from multiple and independent sources (16, 18, 20) is interleaved together to form a continuous data stream (26) to the tape device (22). In this way, the data (10, 12, 14) from the several slow sources (16, 18, 20) can be multiplexed together so that they form a single high speed data stream (26) that matches the speed and capabilities of the tape device. For example, the three jobs (16, 18, 20) can be processing data at the rate of 4 MB/second and the tape device (22) will be transferring data at the rate of 12 MB/sec. As a result, multiple backups or volume dumps can be performed to a single device. Moreover, jobs (16, 18, 20) are also able to work more efficiently in that they need spend less time storing data.

For the writing of data, the data (10, 12, 14) is interleaved as it is delivered from the source jobs or tasks (16, 18, 20, 24). This negates the need for disk buffers or large storage buffers to perform the speed matching function between the source jobs (16, 18, 20, 24) and the tape device (22). New jobs or tasks can connect to and immediately start writing to the tape device (22) at any time. When the job or task (16, 18, 20, 24) has finished writing to the tape device (22), an entry is inserted into the standard MVS catalog to identify the relationship between the dataset name used by the connected job or task (16, 18, 20, 24) to identify the data (10, 12, 14), and the dataset used for the actual storage of the data (10, 12, 14). The catalog entry also includes information to facilitate the usage of the high-speed search feature of the tape device (22). During the writing process, a duplicate copy can also be made of the data (10, 12, 14) to a like or unlike tape device.

For the reading of the data, the interleaved data (10, 12, 14) is separated and delivered back to the target jobs or tasks (16, 18, 20, 24). Any data for which there is no connected job or tasks is ignored. The VRE software provides fast and timely access to the data (10, 12, 14) even when two or more jobs or tasks (16, 18, 20, 24) are competing for such access. In that regard, the VRE software includes the ability to perform random access using the high speed search feature of the tape device (22) and to use the MVS dataspace and hyperspace features as speed matching buffers when there is conflict between jobs or tasks. In such a fashion, the present invention is capable of delivering the data (10, 12, 14) from tape device (22) back to multiple reading jobs or tasks (16, 18, 20, 24) at rates equal to or better than that achieved when the data (10, 12, 14) was originally written to the tape device (22).

Another major difference between the method and system of the present invention and current tape systems is the concept of full tape storage groups. A tape storage group comprises a single volume or multiple volumes to which data is constantly appended. At some cut-off point, the storage group is switched to a new volume to allow for physical media management. In this way, like data can be managed together onto a small number of volumes as it is written, rather than writing the data onto multiple volumes and then later moving the data onto a smaller number of volumes. Even though the life cycle of data on disk and tape tends to be very different, this concept brings tape data much closer to the way that disk data is managed on MVS systems.

Thus, the present invention eliminates the need for a fixed relationship between the writing job or task requirements and the placement of the actual data. The location for the data is selected at creation time according to predefined rules and the availability and/or status of the tape devices in use at the time. It is no longer necessary to hard code the positions of individual files on a tape. In such a fashion, the present invention eliminates the data management problems associated with stacking multiple datasets onto a single tape in a traditional environment, such as the difficulties concerning JCL changes etc. required to perform restarts when there are failures. The operation of the software can be controlled by both MVS operator commands and by parameter file settings.

In that regard, the operation of the method and system of the present invention will now be discussed in greater detail. As previously stated, the preferred embodiment of the present invention is designed for use in an IBM MVS system, and it is in that system that such operation will be described.

As stated above, the VRE software uses the concept of client and server jobs. Client jobs are those requiring their I/O to be managed. The I/O services are provided either by standard jobs or by a started task. The latter is the preferred option as there is a need to schedule the server jobs to run concurrently with the client jobs. The term "server job" as used herein denotes an execution unit of one of the server programs.

These programs can either be running within a standard piece of JCL or directly under the subsystem's started task. In the latter case, they are often referred to as "server sub-tasks." Specific difference between the two modes of operation are discussed below. Most of the examples discussed herein assume that the started task is not running and that the client and server are running under individual pieces of JCL. The connections between the client and the server jobs is provided via the MVS system interface. This interface is already used by a number of IBM and third party products. The subsystem interface provides the ability for software to provide a virtual interface for QSAM or BSAM I/O.

Unlike a traditional subsystem implementation, the use of a dedicated started task to administer the client-server connections is optional. Because the IBM utility DFDSS does not tolerate reading or writing to the subsystem interface, other arrangements have to be made when performing volume or dataset dumps and restores. This problem is circumvented by utilizing the DFDSS user interface.

This is provided by a wrap-around program that invokes DFDSS and redirects any allocations for the subsystem to appropriate server jobs. The association between the client and server jobs is by dataset names quoted at either end. Such implementation is simple and allows for easy generation of the JCL to extract data from the tape datasets in the event of a disaster recovery scenario. However, as will be readily apparent to those of ordinary skill in the art, other means of association can also be used.

As previously stated, there are two types of jobs that need to be run, namely, server and client jobs. Server jobs (BMUXRDR AND BMUXWRT—described in greater detail below) perform the actual I/O to the tape devices on behalf of one or more client jobs. Each of the server jobs will either be reading or writing to a single tape device. The server jobs are either manually scheduled by job submission or automatically scheduled and run by the subsystem's started task. Client jobs are standard application programs that perform either QSAM or BSAM I/O.

Client Server Connections

The associations between the client and server jobs are formed by the dataset names quoted on the DD statements in both jobs. As previously stated, however, those of ordinary skill in the art will appreciate that other means of association can also be used.

The basic rule is that the dataset name quoted on the client DD statement must have one or more qualifier than the dataset quoted in the server DD statement. This extra qualifier is used as the member name that identifies the client's data within the server's dataset. This comparison excludes the extra qualifiers in GDG dataset names.

The JCL in the example provided below illustrates a client and standalone server job passing data from a disk to a tape file. The SYSUT2 DD statement in the client job specifies that a connection is required via the BMUX subsystem to a server job. The server job picks up client jobs based upon the dataset name quoted on the MUXOUT DD statement. To perform writes from multiple jobs, each of the client jobs would need to be submitted with a unique dataset name quoted.

Example Client And Server JCL:

```
//CLIENT JOB O..
//WRITE EXEC PGM=IEBGENER
//*
//SYSUT1 DD DISP=OLD,DSN=DISK.INPUT.FILE
//SYSUT2 DD SUBSYS=BMUX,
        DSN=TAPE.OUTPUT.FILE.MEMBER,
        DCB=*.SYSUT1
//*
//SYSPRINT DD SYSOUT=*
//SYSIN DD DUMMY
//SERVER JOB O..
//FORWARD EXEC PGM=BMUXWRT
//*
/MUXOUTDDDISP=(NWE.CATLG.DELETE),
        DSN=TAPE.OUTPUT.FILE,
//      UNIT=3490
/*
```

As can be seen from this example, JCL changes are required to redirect I/O to the subsystem. This must be tempered with the fact that the access to the subsystem needs to be managed and scheduled in order to maximize any objectives. One major difference to normal JCL processing in the method and system of the present invention is that the DISP parameter is not honored. This means that all client datasets open for write access are treated as having a DISP parameter of (NEW, CATLG,CATLG).

MVS Catalog

To maintain the relationships between the client job's dataset name and the dataset name used by the server job, the standard MVS catalog is preferably used to store information, although other files may be used to store catalog information. This means that the MVS catalog will reveal entries for both client and server dataset entries. The VRE software, however, is also able to work without the MVS catalog, but this can reduce the read performance.

The catalog entry for the server's dataset is usually for a standard tape file, and it will normally form part of a GDG. The catalog entry for the client's dataset is non-standard in that it does not contain details of a real device type or volume. The catalog entry actually contains direction and location information to enable the client's data to be found. This is encoded into the volume information of the catalog entry.

As mentioned previously, the connection relationships between the client and the server datasets are based upon the use of an extra dataset qualifier. If the server's dataset is a GDG, this does not provide sufficient information to establish the relationship between the two datasets. The first part of the client's catalog entry therefore contains the Generation number of the associated server dataset. This is illustrated in the following Sample Catalog Listing. As seen therein, there is no dependence between the generation numbers of the client and the server dataset names.

Sample Catalog Listing:

| DATASET | VOLUME |
|---|---|
| SERVER.DATASET | ??????(GDG base) |
| SERVER.DATASET.G0010V00 | 766322 <<a |
| SERVER.DATASET.G0011V00 | 765129 <<b |
| SERVER.DATASET.G0012V00 | 763156 <<c |
| SERVER.DATASET.DISKDUMP | ??????(GDG base) |
| SERVER.DATASET.DISKDUMP.G003V00 | ##0010 >>a |
| SERVER.DATASET.DISKDUMP.G004V00 | ##0012 >>c |

-continued

| DATASET | VOLUME |
|---|---|
| SERVER.DATASET.DATAFILE | ??????(GDG base) |
| SERVER.DATASET.DATAFILE.G0007V00 | ##0010 >>a |
| SERVER.DATASET.DATAFILE.G0008V00 | ##0011 >>b |

G10 (generation) of SERVER.DATASET contains both G3 of ~.DISKDUMP and G7 of ~.DATAFILE.
G11 of SERVER.DATASET contains only G8 of ~.DATAFILE.
G12 of SERVER.DATASET contains only G4 of ~.DISKDUMP.

From the standard catalog or dataset listings (e.g., ISPF 3.4), it is possible to either deduce the contents of a server dataset or to deduce within which server dataset a client dataset has been stored. The additional information stored within the catalog entry enables the read server job to locate the start of data and to schedule concurrent access effectively. This information includes both the volume number (for a multi-volume server dataset) and the physically blocked ID within the volume. This latter piece of information enables the high-speed positioning feature of the tape drives to be used.

Using the catalog, the VRE software is able to cope with duplicate members within the server dataset. (These are not allowed to occur simultaneously within the server dataset). Each occurrence of the member has a different location fingerprint and this is reflected in the catalog entry. This allows for a situation whereby a job is restarted and writes to the same logical dataset. During scan processing, this distinction cannot be made.

As previously stated, the VRE software can also work without the use of the MVS catalog. If a catalog entry does not exist, processing defaults to a sequential scan of the server dataset. This is, however, a less efficient method of locating the client dataset.

Started Task

The subsystem's started task (BMUXSTC—described in greater detail below) provides the function of automatically dispatching and administering the server "jobs." The server gobs are run as sub-tasks of the started task rather than real jobs. The started task checks each client job request and either dispatches a new server job to service the I/O or forwards the request to a server job already running.

The dispatching of new server jobs is subject to constraints imposed by the started task. These are modifiable by operator command. The operator command enables the number of server jobs (and hence devices) to be limited, and provides the ability to hold/release processing. There is also the ability to restart a failed server job or to cancel a running one.

For simplicity, the method and system of the present invention need not support the creation of new generations of the server datasets. In that regard, the writer server could always append (MOD) to an existing output dataset. This results in each additional client dataset being stacked onto the server dataset until a generation switch is performed. Such switching of the server's output dataset is achieved by running an external job to create a new generation of the server dataset. As soon as the new generation is created, the started task will switch all new output connections to this new generation of the dataset. Example JCL required to switch server dataset generation is shown below.

Sample New Generation JCL:

| //NEWGEN | EXEC PGM=IEBGENER |
|---|---|
| //SYSPRINT | DD DUMMY |
| //SYSIN | DD DUMMY |
| //SYSUT1 | DD DUMMY |
| //SYSUT2 | DD DSN=SERVER.DATASET (+1), |
| // | DISP+(NEW,CATLG,DLETE), |
| // | UNIT=3490, |
| // | DCB=(SERVER.PATTERN,LRECL=180, |
| // | RECFM=FB) |

DFDSS

DFDSS uses its own access method when reading and writing to or from tape. To circumvent this problem, a shell program (BMUXDSS) is provided to invoke DFDSS and intercept any I/O that should be directed to subsystem DDs and pass it across to the appropriate server jobs. This means that all of the standard functions of DFDSS can be used without any changes. For dumps, this includes the ability to duplex dumps to two devices. In this case, all combinations of output to server jobs and direct I/O to devices are supported.

It is allowable for the duplexing to be to the same server job, but this is of little practical use. In order to maximize the throughput of dumps and restores taken with DFDSS, it is necessary to plan the relationship between the client DFDSS jobs and the server jobs.

With many modern disk subsystems, there is a physical relationship between logical system volumes. This can be as a result of logical volumes sharing a single physical spindle or because of the way that RAID has been implemented within the disk subsystem. RAID can also have an adverse effect on restores if they are performed to the physical volumes within the same RAID group. Most disk subsystems also have hidden internal pathing that can cause internal bottlenecks.

To design the JCL to perform an optimal set of volume dumps, it is first necessary to build a series of client jobs using knowledge of the internal data pathing and relationships of the disk subsystems. Although the RAID effects do not normally effect dumps, this still needs to be considered since the way the backup stream is built dictates how the restore jobs are built and run. This optimization may need to be achieved by trial and error as it is not always clear where the individual bottlenecks of a disk subsystem will occur.

As a general guide, there should be a ratio of between 3:1 and 4:1 in the dump restore job streams and server job streams Once a set of jobs has been built to perform dumps, the gender of the jobs may simply be "reversed" to perform bulk restores. Unlike traditional tape stack methods, bulk restores required for disaster recovery can be done quickly and efficiently.

It is possible to submit all of the required restore jobs and then all of the server jobs. The server jobs will simply percolate through, picking up the client jobs connection requests as required. The availability of the restore jobs to connect to the server jobs is critical to achieving maximum throughput. If the client has not indicated availability to the server job when the server detects the beginning of data, the connection request will be suspended until the server has an opportunity to reposition the input file. This is not performed until data transfers for other members have finished. An example schedule of dumps and restores is shown below.

Sample Dump And Restore Schedule:

| Dump Stream 1 | Dump Stream 2 | | |
|---|---|---|---|
| A00 | A10 | | |
| A01 | A11 | | |
| A02 | A12 | | |
| A03 | A13 | | |
| A04 | A14 | | |
| A05 | A15 | | |
| A06 | A16 | | |
| A07 | A17 | | |
| Restore Stream 1 | Restore Stream 2 | Restore Stream 3 | Restore Stream 4 |
| A00 | A01 | A10 | A11 |
| A02 | A03 | A12 | A13 |
| A04 | A05 | A14 | A15 |
| A06 | A07 | A16 | A17 |

This is a simple schedule giving a list of devices to be dumped to a single tape device. The two dump streams and four restore streams split gets around the connection timing problem by making sure that the next restore is cued up and ready to run while the present restore is running. The schedule also illustrates how to separate the devices being dumped so as to minimize contention within the disk subsystem. As a general rule, choosing device addresses that are widely spaced will decrease the likelihood of contention.

Security

The started task or the server jobs need access from the security access subsystem to be able to read and write to the real datasets. The security access of the started task is especially important as it potentially needs access to a large part of the MVS system. Besides read (READ) or write (UPDATE) access to the real datasets (server datasets), the started task or server job also requires sufficient access (CONTROL) to catalog the client datasets.

The server jobs and started task also perform proxy checking on behalf of the client jobs. This means that errors will be reported by the server rather than the client job. Errors will be reported back to the client by the server. The normal reaction will be to ABEND. The security checking is done this way because it enables a non-authorized program to connect to the server jobs or started task by the internal APL. As always, the client cannot be depended upon to perform the security check correctly, so the server has to perform the check on the client's behalf.

It is possible to set-up the security rules so that an individual user has access to an individual member of the server dataset, but not to either the other members or the actual server dataset. However, this may prove cumbersome to administer. It is therefore recommended to only write data with like attributes to a single server dataset.

Data Management

MVS, the tape management system, and other data management utilities are unaware that the server's real dataset contains data from multiple sources. Much like a standard PDS or PDSE, they assume that the user is organizing data correctly.

Such data organization should be kept simple, ensuring that only data will like attributes, data retention and management are placed together within the same server dataset. For example, weekly and monthly dumps should not be mixed within the same server datasets as it is not possible to expire or delete individual members and recover the space. When stacking data to REDWOOD cartridges, it should be accumulated onto a set of cartridges over a fixed period of time, which could be, for example, a day or the time of the batch run.

Once the checkpoint has been reached, jobs should be scheduled to switch all of the server datasets to a new generation and cartridge. For disaster recover, all catalog entries required for the recovery should be placed within a single user catalog. This catalog should then be included in the critical set of data required to boot-strap the minimal MVS system.

The server datasets normally contain 200,000 byte blocks. These datasets cannot be handled by most standard utilities. To overcome this problem, a maintenance program (BMUXMANT—described in greater detail below) is provided to copy and analyze the server datasets. The analyze function of the maintenance program enables a report to be generated on the contents of the server dataset. It also enables the MVS catalog entries to be rebuilt in case of loss or corruption.

The copy function of the maintenance program also generates a report. The copy is intelligent in that is adjusts the internal dataset names for each member relative to the output dataset. This enables both copies to be truly accessible. This also differs from prior art methods and systems in that the copy can be made to different media types without problems. The copies can, in fact, be appended to each other.

If the catalog option is chosen with the copy, the members will be cataloged relative to the name of the destination server dataset. For example, if the server dataset ORIG.DATA contains the member ORIG.DATA.MEMB, when copied to the server dataset COPY.DATA, the member name will be changed to COPY.DATA.MEMB. If the member is a GDG, the generation number is preserved.

The maintenance program can be used to make usable off-line copies of previously taken backups or dumps. To do so, the original dataset must be switched to a new generation prior to the copy being taken. If making daily tapes, this would typically form the system checkpoint for managing one day's worth of data.

Reading and Writing

To optimize throughput, the server jobs normally use EXCP to perform I/O. The data from each client job is preferably collected into 200,000 byte blocks. However, when that amount of data is not available, such as at the end of transmission of data from a client job, a smaller block may be used. Such large blocks minimize the channel program set-up overheads associated with ESCON channels. Each block preferably contains data from only one client and has identification information for the client. It should be noted that the tape datasets cannot be handled correctly by standard access methods, which will truncate the blocks after 32760 bytes and fail to notice that the blocks are too big. The block size can be overridden by quoting a block size when the tape dataset is created.

By default, the server jobs allocate eight buffers and allow for four active I/Os (a different default applies when the server jobs are run under the started task). This allows for an average number of client tasks with double buffering. This value can be overridden by a parameter to the server jobs. Increasing the number of buffers too much will result in excessive storage consumption. In that regard, the server job is only serving as a pipe and as such cannot accept data faster than it can push it back out again.

One buffer for each client job and two for performing I/O are preferred. For each client connection, the server job reports statistics about the number of blocks transferred and the buffer gets requests. If the latter value exceeds the number of blocks by a reasonable margin, it indicates that the client job is having to wait for a free buffer. If all of the clients are reporting similar ratios of buffer gets to blocks transferred, this indicates that the client is overrunning the capacity of the server job. This is either because there are insufficient buffers or because the limit of the tape device has been reached.

In addition, the server job reports the number of times that it serviced device interrupts and started new I/Os. If the interrupt value starts to exceed the number of blocks transferred, this is an indication that there is a shortage of CPU time and that the server job is not being dispatched quickly enough. In that event, the dispatching priority of the server jobs may be increased.

The ratio of the number of times new I/Os were started to the number of blocks transferred roughly indicates the number of times the server was queuing for I/O. A more accurate figure can be determined from the IOSQ time from RMF. The read server program also reports how many blocks it discarded because there were no client jobs connected that required them.

When either of the server programs are being run under the control of the started task, it is possible to retrieve extra information about the throughput of the server jobs (or sub-tasks). If the STATUS command is issued to the started task, it will return information about each server that is running, the number of client connections and the current throughput being delivered from the tape device. When reading, this includes the transfer of blocks that are subsequently discarded.

Client Data

Although the VRE software is able to cope with a wide range of data, it is optimized for handling large files where the client jobs are optimized to perform I/O themselves. Handling numerous small datasets decreases performance of the write server since it has to suspend data transfers and perform buffer flushing every time a client database is closed off. Without buffer flushing, there would be no confidence as to whether client data made it onto the real device by the time the client job had finished.

On standard tape devices, this is not a significant problem. On the high speed REDWOOD tape devices recently developed, however, this results in very noticeable delays. At present, because of the speed disparity previously discussed between the tape and disk subsystems, this subsystem runs approximately at the speed of a DUMMY DD statement.

As an example of the difference that optimized I/O can make, four DFDSS (BMUXDSS) jobs to dump four large files with 4 KB blocks to the subsystem will probably reach the limit of the tape device. In contrast, the same jobs using IEBGENER will degrade I/O performance by a factor of about 4, and the disk subsystem will probably reach its throughput limits.

This difference is also observable in the throughput difference between dumps and restores. The disk subsystems have optimized channel commands for volume dumps, but do not have the equivalent channel commands for restores. This means that the restore program and the disk subsystem have to work harder in order to deliver the data back onto the disk.

When performing concurrent reads from the same server dataset, there is a certain amount of throughput interaction between the client jobs. This occurs when one of the client jobs is unable to accept the data at a rate that is comparable to either the speed at which the data was written or the speed at which the other client jobs are processing. The I/O will be throttled down to the speed of the slowest job because the server job only has a limited capability to buffer data. Increasing the number of buffers will not normally address this problem due to the amount of data involved.

Instead, this is an area where management of the data according to the method and system of the present invention is the solution. For a single client job reading from the subsystem, the fact that server jobs must potentially read and discard extra blocks will not effect performance. In this case, the server jobs will be able to deliver comparable or better performance than when the data was originally written.

Stacking

As previously discussed, traditional tape stacking methods and systems are only able to exploit the capacity of the REDWOOD tape devices, not the performance. Moreover, they depend upon post processing to stack the data from the original tapes onto the high capacity tapes. This requires extra movement of the data and also creates problems with scheduling of jobs and devices.

The VRE software also performs a basic tape stacking function. However, unlike a traditional tape stacking product, the VRE software effectively stacks data as it is written. To do so, JCL changes to direct access to the subsystem are required. Moreover, to prevent deadlock, no jobs may attempt concurrent read or read and write access to the same server dataset.

The management of the dataset stacking according to the method and system of the present invention is very straightforward. It is controlled by initial placement of the data (i.e. the dataset name) rather than by a separate set of parameters. The comments in the data management section above also apply in this scenario. Like data should be placed together at creation time, rather than being written in one place and subsequently managed to a different place.

Because of the way that the VRE software handles and catalogs the data, it solves the problems previously discussed concerning stacking data onto high capacity tape media like the REDWOOD devices. For example, the problem concerning decreased performance when closing off a dataset is even worse for standard label processing, which involves actually driving through all of the data up to the point at which the requested data starts. Although the ILH on the REDWOOD media enables limited use of the high speed search, it still has to stop at the beginning of each dataset on the volume. On a traditional tape drive, the use of the high speed search can also reduce the access time to the data. The read server is also able to schedule concurrent read access to the tape volume to hunt up and down the tape volume for individual client datasets as requested.

However, locating and reading data according to the method and system of the present invention is more efficient than standard label processing. The physical location of the start of data is stored within the MVS catalog and the read server uses this to exploit the high speed search option of the REDWOOD drives. In the event of multiple requests to the same server dataset, the server orders and services the requests in the order that they physically occur within the dataset to increase the probability that requests further up the dataset will be serviced because the members overlap. In the event that requests point to different physical volumes within the server's dataset, the request for the currently mounted volume are given priority to lessen the overhead of a volume swap.

The read server program will also work without the assistance of the MVS catalog. In this case, the server falls back to a sequential scan of the server dataset. Although the server is able to scan the dataset at high speed, this can be a time consuming process. It is therefore only practical when the bulk of the data on the server dataset needs processing, such as when performing a disaster recover restore.

Scheduling

The started task (BMUXSTC—discussed in greater detail below) has several parameters and commands to control the scheduling of the server sub-tasks. These enable processing to be suspended and released as well, enabling the tuning of the tape device usage. Limits can be placed upon started tasks usage of tape devices by the MAXSERV parameter. This limits the number of server sub-tasks that can be dispatched, which may be needed when the started task is sharing the tape devices with another application. This will prevent the started task from monopolizing the resource. The limit on the server sub-task can be changed at any time via an operator command.

The VRE software uses standard catalog access of the server datasets. As a result, the server jobs (or sub-tasks) depend upon other products to perform separation of the device allocation. This is required in a mixed media environment to ensure that the correct type of device is allocated for the correct media.

An additional parameter that is used to control device scheduling is the HOLD parameter. This sets a time interval that dictates how long the server program will continue to execute after the last client job is disconnected. The parameter helps prevent mount thrashing by the server job. For example, with a multistep job stacking data to a single server dataset, there is a small window between each job step during which there will be no connection to the server. Holding the server active saves a dismount/mount cycle.

With sufficient devices available, the HOLD parameter could be extended to several minutes. In this way, the subsystem performance can be increased by decreasing the mount, threading and positioning time. Data access requirements should be carefully checked before doing this as performance can be degraded by ending up with all devices waiting on hold and other requests waiting for other server subtasks. For this reason, increasing the HOLD time also implies increasing the MAXSERV number.

Figure 2:
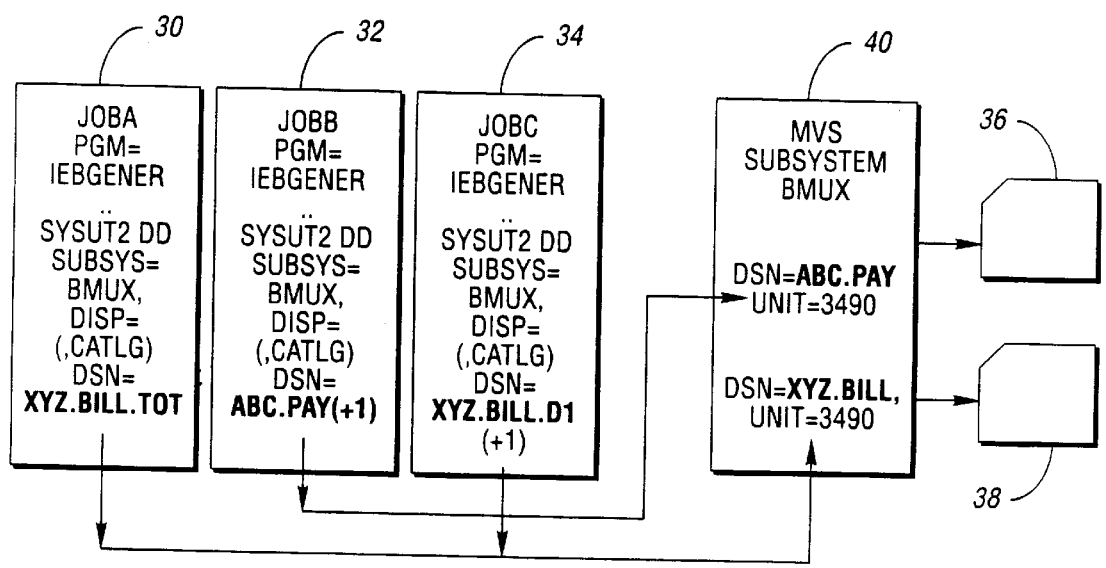
FIG. 2 is a flow diagram of data storage according to a prior art method and system.

Referring now to FIG. 2, a flow diagram of data storage according to a prior art method and system is shown. As seen therein, data from multiple client jobs (30, 32, 34) is stored on separate tape cartridges (36, 38) according to dataset name. More specifically, MVS subsystem BMUX (40) directs all data associated with one dataset name (ABC.PAY) for storage as a volume on one tape cartridge (36), and all data associated with another dataset name (XYZ.BILL) for storage as a volume on another tape cartridge (38). In that regard, tape cartridges (36, 38) are IBM 3490 devices.

Figure 3:
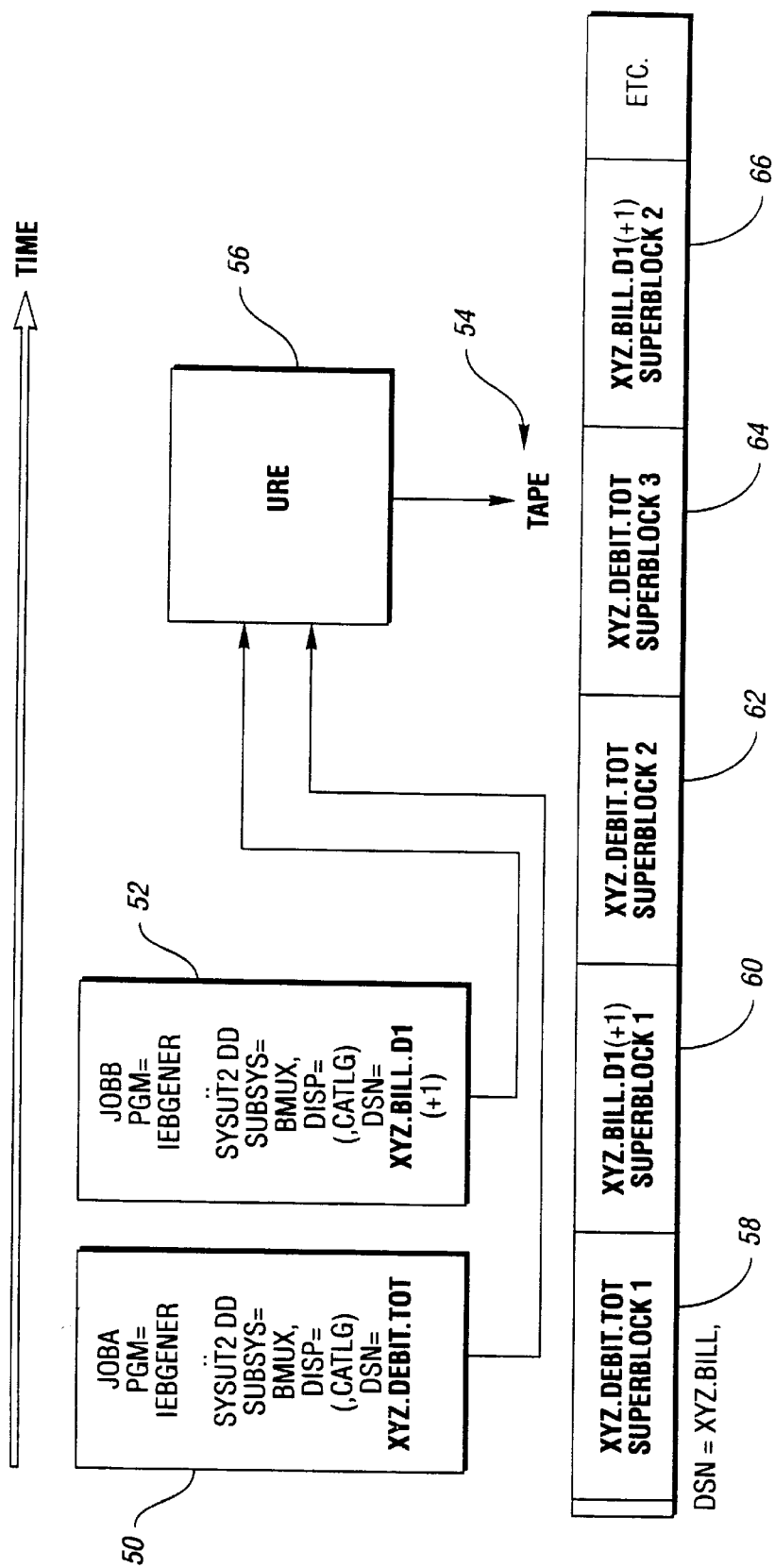
FIG. 3 is a flow diagram of data storage according to the method and system of the present invention.

In contrast, FIG. 3 depicts a flow diagram of data storage according to the method and system of the present invention. As seen therein, data from multiple client jobs (50, 52) is stored on a single tape cartridge (54). More specifically, each time sufficient data (e.g. superblock) has been received from client job (50), a data packet (58, 62, 64) is created identifying the dataset name (XYZ.DEBIT) associated therewith. Likewise, each time sufficient data (e.g. superblock) has been received from client job (52), a data packet (60, 66) is created identifying the dataset name (XYZ.BILL) associated therewith.

While preferably superblocks, data packets (58, 60, 62, 64, 66) may be any size. Alternatively, data packets (58, 60, 62, 64, 66) may also be defined in terms of time. Moreover, data packets (58, 60, 62, 64, 66) may include a number of different records or files associated with a dataset name. Data packets (58, 60, 62, 64, 66) may also alternatively include data records or files associated with multiple dataset names (i.e., from multiple sources).

Data packets (58, 60, 62, 64, 66) are transmitted in a continuous data stream by VRE software (56) to tape (54) as they are created. At tape (54), data packets (58, 60, 62, 64, 66) are then stored as they are received (i.e., in an interleaved configuration). As a result, data packets (62, 64) associated with the same dataset name (XYZ.DEBIT) may be located on the tape (54) adjacent one another.

As previously stated, tape (54) is preferably a StorageTek REDWOOD device. As a result, such interleaved storage efficiently exploits the increased storage capacity thereof. Moreover, as previously described, data from client jobs (50, 52) is received by VRE software (56) in a multiplexed fashion. As a result, the increased rate at which data may be transferred to tape (54) is also fully exploited.

Still further, and as also previously described, the encoding of data packets (58, 60, 62, 64, 66) to identify the dataset or datasets with which they are associated, as well as the individual records or files within the dataset or datasets, also facilitates efficient retrieval. More specifically, the present invention uses the dataset name or names associated with each data packet (58, 60, 62, 64, 66) to return the data packets (58, 60, 62, 64, 66) to a requesting source. Retrieval also includes "un-packeting" (or "de-blocking") of the individual records or files within each data packet (58, 60, 62, 64, 66) (or superblock)

Figure 4:
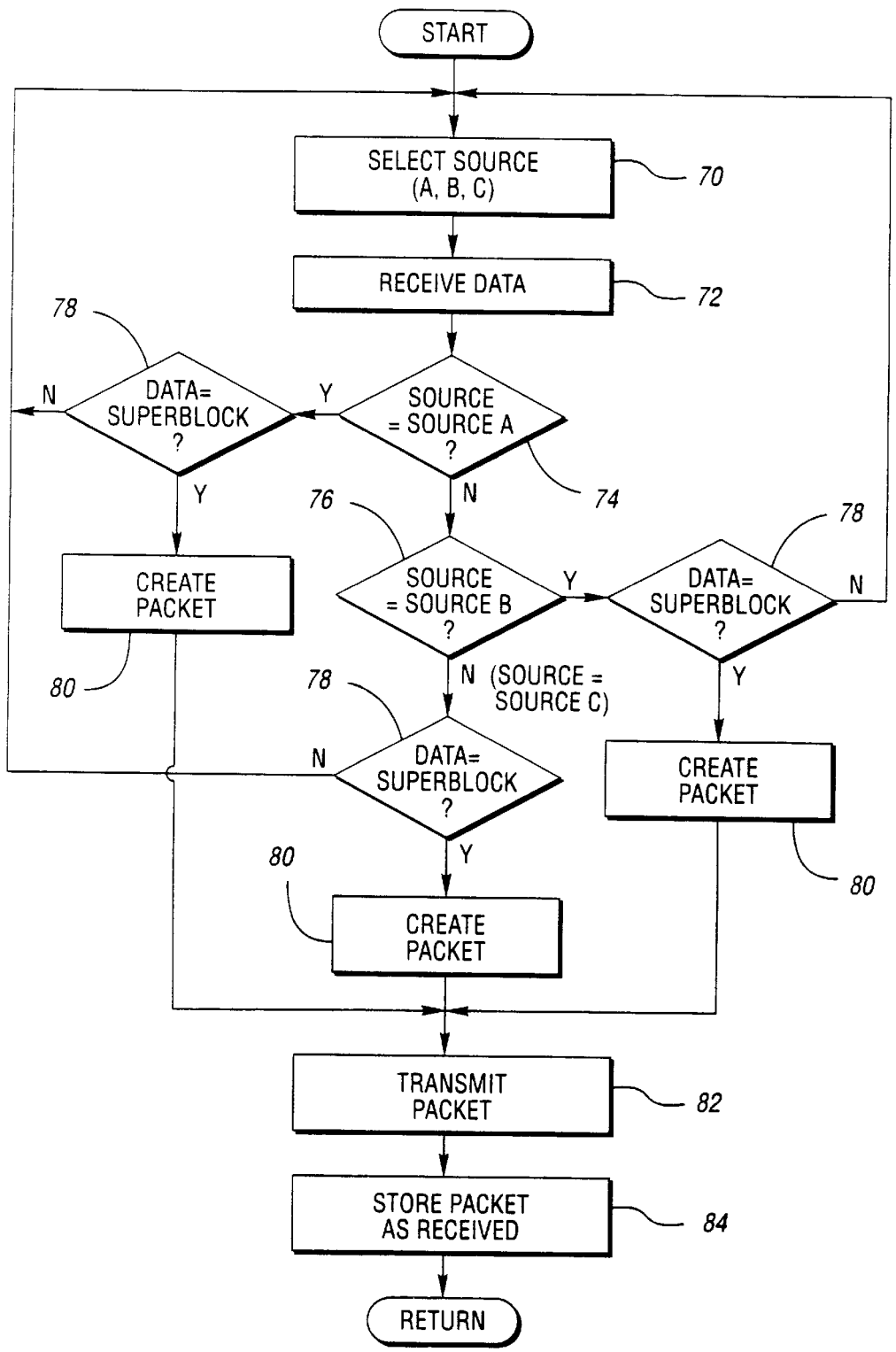
FIG. 4 is a simplified flowchart of the method of the present invention.

Referring next to FIG. 4, a simplified flowchart of the method of the present invention is shown. As seen therein, one of multiple sources is selected (70) from which data is then received (72). As previously described, a data source may be an application program or a system utility, such as a disk backup utility. In that regard, FIG. 4 illustrates three sources (A, B, C).

Once the source is identified (74, 76), it is determined (78) if the amount of data received from that source is equal to a superblock. As previously discussed, other amounts of data, or the data received during a selected period of time may also be employed. If sufficient data from the respective source has not yet been received, additional data from that source may be received (72), depending on the source selected (70). In that regard, as also previously discussed, receipt of data from the multiple sources is multiplexed to improve efficiency.

Alternatively, if sufficient data from the respective source has been received, a data packet is created (80). This includes identification of the source or sources of the data associated with the data packet, as well as identification of individual records or files within the data packet. Thereafter, the data packet is transmitted (82) to the tape subsystem where it is stored (84) as it is received (i.e., interleaved).

While not specifically illustrated, the method of the present invention also provides for retrieval of the data packets and the individual records or files therein to a requesting source. As previously described, this is accomplished using the prior encoding of the data packets to identify the dataset or datasets with which they are associated, as well as the individual records or files within the dataset or datasets. As also previously described, retrieval includes "unpacketing" (or "de-blocking") of the individual records or files within each data packet (or superblock).

Once again, FIG. 4 represents a simplified flowchart of the method of the present invention. As those of ordinary skill in the art will appreciate, the VRE software may perform its various functions in any sequence and/or simultaneously. In so doing, however, the VRE software acts as control logic operative to receive data from multiple sources, create data packets comprising at least a portion of the data therefrom, transmit the data packets to a storage device having a tape medium, and store the data packets on the tape medium in an interleaved configuration. In that regard, it should be noted that such functions are preferably accomplished without storage of the data and/or data packets on any intermediate disk or tape medium, such as for preprocessing before stacking on another tape medium as described above in regard to the prior art. That is, storage of data to tape (54) is "direct."

As also previously discussed, the VRE software also acts as control logic operative to retrieve the data packets from the tape medium and transmit them to their respective sources. In that regard, it should be noted that such functions are preferably accomplished without storage of the data and/or data packets on any intermediate disk or tape medium. That is, preferably, retrieval of data from tape (54) is also "direct."

Alternatively, however, the VRE software may also be provided with the ability to buffer data being read from tape (54) on another storage medium (such as disk, tape, or main storage). In such a fashion, data may be read from the tape at high speed, and stored on an intermediate medium for "dribble" feeding back to the destination source (e.g. an application program or system utility). In the meantime, tape (54) may be repositioned so that the data can be fed back to another destination source. It should also be noted that, while described in the preferred embodiment as software at the operating system level, the control logic of the present invention may also be implemented (either in whole or in part) as software at other levels, or as any type of software equivalent (e.g., devices or hardware).

More specific structure and flow of the VRE software of the method and system of the present invention is described below with reference to various programs or routines thereof, having the names shown:

BMUXLOAD (LOAD)
Called at IPL time by MVS to initialize subsystem:
   locates subsystem SSCVT;
   load BMUXAM into CSA;
   register PC CALL service to BUMUXAM for cross memory calls;
   register PC CALL service to BUMUXAM for nonswappable waits;
   create SSVT;
   link SSVT to entry points in BMUXAM;
   exit back to MVS.
BMUXAM (SUBSYSTEM I/O)
On allocation call to the subsystem from MVS:
   BMUXAM called;
   creates control block in CSA;
   preserves fields passed during allocation in CB;
   return to MVS.
On unallocation call to the subsystem from MVS:
   BMUXAM called;
   CSA control block unlinked and destroyed; returns to MVS.
On open call to the subsystem from MVS:
   BMUXAM called;
   BMUXOPEN loaded;
   control passed to BMUXOPEN with parameters;
   status updated in CSA control block;
   return to MVS.
On close call to the subsystem from MVS:
   BMUXAM called;
   control passed to BMUXOPEN with parameters;
   BMUXOPEN loaded;
   status updated in CSA control block;
   return to MVS.
On open call to BMUXOPEN:
   create own private control block for connection details, etc.;
   build the control block for connection to server job;
   locate subsystem CVT;
   if started task (BMUXSTC) active:
   perform a cross memory call to the started task service request routine in BMUXSTC;
   call non-swappable wait routine;
   if BMUXSTC not active or request dropped:
   raise connection ENQ;
   call non-swappable wait routine;
   check for connection failures;
   connection to the server now complete and I/O can be started;
   update MVS control blocks with I/O address, etc.;
   return to BMUXAM.
On close call to BMUXOPEN:
   perform a cross memory call to the server I/O routine in BMUXWRT/BMUXRDR to indicate connection close;
   if required, wait for post from server job to indicate all I/O completed;
   destroy own private control block and perform tidy up;
   return to BMUXAM.
On I/O call to BMUXOPEN:
   call server I/O routine in BMUXWRT/BMUXRDR;
   if no buffer available:
   wait for posting from server job;
   retry I/O call to server I/O routine;
   check I/O status;
   perform any I/O housekeeping;
   return to MVS.
BMUXDSS (DFDSS)
When invoked from JCL:
   set-up parameters call to ADRDSSU;
   call ADRDSSU specifying a UIM within BMUXDSS;
   return to caller.
When invoked by ADRDSSU for function 13 (parameter validation):
   only proceed if a dump or restore operation;
   check the input (restore) and output (dump) DD statements for subsystem allocations;
   if allocation is to a subsystem dataset:
   deallocate the DD statement;
   reallocate the DD statement as a DUMMY;
   initialize a control block for connection to the server job;
   exit back to ADRDSSU.
When invoked by ADRDSSU for function 0 (Task start):
   locate subsystem CVT;
   if started task active, for each DD statement:
   perform a cross memory call to the started task service request routine in BMUXSTc;
   call non-swappable wait routine;
   if started task not active or request dropped, for each DD statement:
   raise connection ENQ;
   call non-swappable wait routine;
   check for connection failures;
   connection to server now complete and I/O can be started;
   exit back to ADRDSSU.
When invoked by ADRDSSU for function 3 or 6 (read or write tape block):
   perform a cross memory call to the server I/O routine in BMUXWRT/BMUXRDR for each DD statement;
   if no buffer available:

wait for posting from server job;
retry I/O call to server I/O routine;
check I/O status;
perform any I/O housekeeping;
exit back to ADRDSSU.
When invoked by ADRDSSU for function 14 (task ended):
call server I/O routine in BMUXWRT/BMUXRDR to indicated connection close for each DD statement;
if required, wait for post from server job to indicate all I/O completed;
destroy own private control block and perform tidy up;
exit back to ADRDSSU.

BMUXSTC (STARTED TASK)
When the started task service routine is called:
validate the request;
build a request control block;
add to the started tasks request queue;
post main task;
return to caller.
The main flow of the started task is as follows:
process program parameters;
initialize up control blocks, etc.;
locate the subsystem CVT;
register the service request routine in the CVT;
set-up for operator commands;
start timer and start main processor loop;
wait for some event;
check for completed server sub-tasks and for each completed sub-task;
free off control blocks, free device allocation and post clients on tasks request queue;
check for and service any operator commands;
service timer interrupt;
check main task request queue and for each request found:
resolve out the server dataset name;
perform MVS catalog lookups;
validate request and post client if there is a problem;
try to match the request to an existing server sub-task;
if a match is found, move the request onto the sub-tasks request queue;
if no match is found and subject to no imposed limits being exceeded:
initialize a control block for the new sub-task;
move the request onto the new sub tasks request queue;
start the program BMUXALOC as a new sub-task;
go and wait for another interrupt;
terminating, de-register service request routine from CVT;
destroy control blocks and perform tidy up;
return to MVS.

BMUXALOC (ALLOCATION)
When this is invoked as part of a new sub-task:
initialize;
allocate a tape device (dataset) for reading or writing;
if allocation fails because of resource problem:
wait for a minute;
retry device allocation;
invoke BMUXWRT or BMUXRDR depending upon access required.

BMUXWRT (WRITE)
This details the life of a connection request to the program. Due to the multiplicity of events that can occur, the actual program structure does not necessarily reflect the logic flow through the program. The individual paths are dealt with separately.

When either an ENQ request is detected or a request has been passed from BMUXSTC:
perform request validation and post client if errors;
perform SAF check and post client if failed;
build own connection control block;
update client's control block with connection details (it is not yet posted);
if there are no other connections:
open output file;
create I/O buffer;
obtain an I/O buffer for initial connection from the free buffer queue;
insert label information into buffer;
post the client so that I/O can commence.
The client job then commences calls to the I/O service routine:
if a connection close request:
update connection status to closing;
place current buffer onto write queue;
return to caller indicating a wait is required;
post main server task;
if a standard I/O request and no buffer available:
get a buffer from the free queue;
if none available, place client on wait queue and return to caller indicating a wait is required;
move record from client's address space into the I/O buffer in the server's address space;
if the buffer fills up:
place current buffer onto write queue;
get a buffer from the free queue;
if none available, place client on wait queue and return to caller indicating a wait is required;
continue moving record;
return to caller.
The program deals with I/O buffers as follows:
buffer extracted from the write queue;
if its the first block from a client connection:
perform read block ID on output device to note start position within the dataset;
update control blocks;
write block to the output device;
wait for the I/O to complete;
check I/O status and perform any end of volume processing, etc.
place buffer back on free queue;
if any client jobs are waiting for a buffer, post them;
if this is the last block for a client job:
perform a synchronize at the device level to flush its buffers;
catalog the client's dataset details in the MVS catalog;
post the client to complete the close;
destroy connection control blocks;
if no other connections:
close output file;
wait for a limited time for any further connections;
if none, terminate the program.
The main structure of the program is as follows:
process program parameters;
initialize up control blocks, etc.;
locate the subsystem CVT;
register the I/O request routine;
start timer and start main processing loop;
wait for some event;

for each completed I/O;
  check I/O status and perform any end of volume processing, etc.;
  place buffer back on free queue;
  if any client jobs are waiting for a buffer, post them;
  if this is the last block for a client job, indicate housekeeping required;
for each buffer on the write queue:
  if first buffer for client, indicate housekeeping required;
  otherwise, start I/O on this buffer;
if timer has popped:
  perform I/O rate calculations;
  check for any new connection requests;
  if any new connections, indicate housekeeping required;
  exit main loop if program needs to terminate;
  restart time;
if housekeeping required:
  ensure that the output file is open;
  note the current position in the output dataset;
  if needed, flush the device buffers;
  check each of the current connections;
  if client job has just connected:
    allocate a buffer from the free queue and post the client to complete the open;
    if no free buffers, place on wait queue;
    if client job active or terminating, ignore;
  if client job terminated:
    catalog the client's dataset details in the MVS catalog;
    post the client to complete the close;
    destroy connection control blocks;
  if no connection:
    close the output file;
    release all buffers;
  deregister the I/O service routine;
  destroy the control blocks and perform tidy up;
  return to MVS.
BMUXRDR (READ)
This details the life of a connection request to the program. Due to the multiplicity of events that can occur, the actual program structure does not necessarily reflect the logic flow through the program. The individual paths are dealt with separately.
When either an ENQ request is detected or a request has been passed from BMUXSTC:
  perform request validation and post client if errors;
  perform SAF check and post client if failed;
  build own connection control block;
  perform catalog lookup;
  update client's control block with connection details (it is not yet posted);
  if there are not other connections:
    open input file;
    create I/O buffers;
    order the connection requests based upon their location in the input dataset;
    mount the lowest volume and seek up the tape to the first client jobs file;
    start reading from the input file;
    when the first block for each connected client has been read, post the client so that I/O can commence.
The client job then commences calls to the I/O service routine:
  if a connection close request:
    update connection status to closing;
    flush all buffers from the client's private queue into the free queue;
    return to caller;
    post main server task;
    indicate housekeeping required;
  if a standard I/O request and no buffer available:
    get a buffer from the client's private queue;
    if end of file encountered, return to caller;
    if none available, return to caller indicating a wait is required;
  move record into the client's address space from the I/O buffer in the server's address space;
  if the buffer runs out:
    place current buffer onto free queue;
    get a buffer from the client's private queue;
    if none available, return to caller indicating a wait is required;
  continue moving record;
  return to caller.
The program deals with I/O buffers as follows:
  buffer extracted from the free queue;
  read block from the input device;
  wait for the I/O to complete;
  check I/O status and perform any end of volume processing, etc.
  if its the first block from a client connection:
    extract and check label information;
    update control blocks;
    post client to indicate open has completed;
  if the block is for an active connection:
    check the block details;
    move the block onto the client's private buffer queue;
    post the client job has disconnected;
  if the block is not required, place the buffer back onto the free queue;
  once a client job has disconnected:
    destroy connection control blocks;
    if other connections pending and none have started I/O:
      order the connection requests based upon their location in the input dataset;
      mount the lowest volume and seek up the tape to the first client jobs file;
      restart reading from the input file;
    if no other connections:
      close input file;
      wait for a limited time for any further connections;
      if none, terminate the program.
The main structure of the program is as follows:
  process program parameters;
  initialize up control blocks, etc.;
  locate the subsystem CVT;
  register the I/O request routine;
  start timer and start main processing loop;
  wait for some event;
  for each completed I/O:
    check I/O status and perform any end of volume processing, etc.;
    if its the first block from a client connection:
      extract and check label information;
      update control blocks;
      post client to indicate open has completed;
    if the block is for an active connection:
      check the block details;

move the block onto the client's private buffer queue;
post the client job if required;
if the block is not required, place the buffer back onto the free queue;
for each buffer on the free queue:
start I/O on this buffer;
if timer has popped:
perform I/O rate calculations;
check for any new connection requests;
if any new connections, indicate housekeeping required;
exit main loop if program needs to terminate;
restart timer;
if housekeeping required:
check each of the current connections;
if client job has just connected:
select the position nearest the beginning of the input dataset;
if client job active, indicate I/O should keep going;
if client job terminated:
flush any buffers back into the free queue;
destroy connection control blocks;
if input file not open:
open input file;
create the I/O buffers;
force cycle round to check for connections and perform housekeeping again;
if no client jobs actively performing I/O:
use locate block to reposition to first file in input dataset;
set this client as being active;
if no connections:
close the output file;
release all buffers;
deregister the I/O service routine;
destroy the control blocks and perform tidy up;
return to MVS.

BMUXMANT (MAINTENANCE)
The main structure of the program is as follows:
process program parameters;
initialize up control blocks, etc.;
open the input file;
create the I/O buffers;
if present, open the output file;
start timer and start main processing loop;
wait for some event;
for each completed read I/O:
check I/O status and perform any end of volume processing, etc.;
if its the first block from a client sub file:
extract and check label information;
print details;
if required, create an entry in the MVS catalog;
if its the end block from a client sub file:
print details;
if a copy is being performed, move the buffer onto the write sequence;
otherwise, replace the buffer back onto the free queue;
for each buffer on the free queue:
start I/O on this buffer;
for each completed write I/O:
check I/O status and perform any end of volume processing, etc.;
move the buffer back into the free queue;
for each buffer on the write queue:
if first buffer for a client sub file:
indicate housekeeping required;
print details;
otherwise, start I/O on this buffer;
if timer has popped:
perform I/O rate calculations;
perform compression calculations;
restart timer.
if housekeeping required:
perform read block ID on output device to note start position within the dataset;
close the input and output file;
release all buffers;
destroy the control blocks and perform tidy up;
return to MVS.

REFERENCES
The preceding programs all take parameters via the PARM=parameter of the EXEC statement in the JCL. The format is name=value,O.. The name/value pairs are separated by either training commas or spaces. Any leading or training spaces are insignificant.

DD STATEMENT
The general format of the DD statement required in a client job to access the subsystem is:
name DD SUBSYS=BMUX
DSN=datasetname
Y,DCB=dcbinto
This defines the connection required from a client job to the server. The rule for the dataset name (DSN) is that it must have one more qualifier than the input or output DD statement quoted in the server job. The names up to this point must match. The extra qualifier in the client's dataset name is used as the member name within the tape file.

For example, if the client quotes a dataset name of "fred.joe.bill", this will be picked up by a server job that is using a dataset of the name "fred.joe." The data for this client will be stored in the member ebilli. Likewise, another client can quote a dataset name of fred.joe.jane and connect to the same server job.

With the above process, the extra qualifiers that result from the use of GDG dataset names are ignored. In the above example, the dataset names "fred.joe" and "fred.joe(+0)" or "fred.joe.G0003V00" are all treated as being equivalent.

The DCB details in the DD statement are normally only required for utilities that work with varied data formats. In this case, the DCB information is required for both input and output. The server just treats the clients I/O requests as a series of records. They are handed back to a reading client job in exactly the same format as they were presented to the server when written. The write server job takes care of building the records into blocks of whatever size. The server job writes spanned records and can handle records of up to 65540 bytes in length.

DD Statement: MUXIN
The MUXIN (default) DD statement identifies the input source of the data. It can come from either tape or disk. The DD name can be overridden by a program parameter.

The dataset name quoted on this DD statement is used as the parameter name for picking up the connections to the client jobs. The client jobs will have needed to have quoted a dataset name which matches this name apart from having an extra trailing qualifier. GDG qualifiers are ignored in this process.

If the input is from tape and the labels dictate that the data was written with 200,000 bye blocks, the program will use EXCP I/O. Otherwise, BSAM I/O is used. If the block size is overridden by DCB parameters, the program will probably misinterpret the input file and return errors.

DD Statement: MUXOUT

The MUXOUT (default) DD statement identifies the output destination for the data. It can be directed to either tape or disk. The DD is optional and its presence indicates that the copy function is to be performed. The DD name can be overridden by a program parameter.

The dataset name quoted on this DD statement is used as the parameter name for picking up the connections to the client jobs. When also performing cataloging, this new name is used as basis for the catalog entry. The client jobs will have needed to have quoted a dataset name which matches this name apart from having an extra trailing qualifier. GDG qualifiers are ignored in this process.

By default, if directed to tape, it will write 200,000 byte blocks and will use EXCP I/O. If the block size is overridden by DCB parameters (must be a multiple of 180) or is directed to a non-tape device, it will use BSAM I/O and will honor the quoted size. The program always writes to the output dataset in extend (MOD) mode.

This DD statement must have the same block size as the input DD statement. Extra DCB information may be required if the original data was created on a different media or with a block size override. Tape based data with a block size of 32760 cannot be copied to non-tape media.

DD statement: SYSPRINT

The SYSPRINT DD statement identifies the destination for the server dataset report The DD is optional. The record length used is 133. The report contains details of where each member is stored within both the input server dataset and the optional copy that is being produced.

Parameter: DDIN=name

The value to this parameter overrides the DD name used for the input device. The default is MUXIN.

Parameter: DDOUT=name

The value to this parameter overrides the DD name used for the optional output device. The default is MUXOUT.

Parameter: BUFS=number

This parameter sets the number of data buffers to be allocated. The value must be between 1 and 15 and defaults to a value of 5. The program allows for double buffering, so twice this value of buffers will actually be allocated. This value will therefore also set the maximum number of queued I/Os that will be generated. This parameter can cause storage ABENDs if the value is set too high. When EXCP I/O is being performed, a value or 15 will allocate 6 MB of storage.

Parameter: HOLD=number

This parameter sets the amount of time that this program will remain active after the requisite number of client jobs have connected, transferred their data and then closed off the connection The value can be between 0 and 99999 and has a default of 0. During this time, the program will check the system for new connections. If any new connection requests are found, I/O is restarted. Once these connections have terminated, the timer is reset and the program will sit and wait again, looking for connections.

Parameter: WAIT=number

This parameter sets the maximum number of seconds that the program will wait for the minimum number of client connections. The value can be between 0 and 99999 and has a default of 600 (10 minutes). The combinations of the CON and WAIT parameters should be set to reasonable values to ensure that the client jobs do not end up without a server job, as opposed to the program holding the tape device while it waits for the requisite number of client jobs to appear.

Parameter: CON=number

This parameter sets the minimum number of client connections to make before the program terminates. The value must be between 1 and 20 and defaults to a value of 1. The effect of this parameter is dependent upon the WAIT parameter. When this time-out occurs, this parameter is effectively set to zero. The parameter is used to synchronize the scheduling of the client jobs with the program. It means that the timing of the client and server jobs is not critical. This gives the client jobs a chance to do pre-processing prior to opening the connection to the server.

Parameter: CATALOG

This parameter indicates that cataloging of the client datasets is required. The cataloging will fail if the catalog entry already exists. If the copy function is not being performed, an attempt is made to catalog the original client datasets on the input server dataset. If the copy function is selected by providing an output DD statement, the modified client dataset names are cataloged. The modified client dataset names contain the same member name or low level qualifier and the same generation number if a GDG as the original The root server dataset name is the only part that is changed.

Parameter: FORCE

This parameter is used in concert with the CATALOG parameter and enforces the cataloging of client datasets. An attempt is first made to catalog the dataset and if this fails a re-catalog is attempted.

Command: MAXSERV=number

This command sets the maximum number of server sub-tasks that will be run concurrently. The value can be between 1 and 20 and has a default of 5.

The parameter is used to limit the subsystem's usage of tape devices. Any requests received from client jobs will be queued by the started task until a server with the name can be dispatched. If a request is received from a client job that can be serviced by an existing running server sub-task, the request is forwarded onto the sub-task and is not queued by the started task. The server program may perform additional queuing of the request.

Command: BUFS=number

This command sets the number of buffers that are used by the individual server sub-tasks. The value can be between 1 and 15 and has a default of 5. The parameter is effectively passed down to the equivalent parameter within the server programs. As the parameter is passed down to all server tasks, it needs to be set to an optimum value for all types of access.

Command: HOLD=number

This command sets the number of seconds that the server sub-tasks will remain active after the last client jobs has disconnected. The value can be between 0 and 99999 and has a default of 20 seconds. The parameter is effectively passed down to the equivalent parameter within the server programs. The parameter enables the effects of server thrashing to be stopped, which can happen with multi-step client jobs stacking data to a single server job. In that regard, there is a finite time during which there will be no connections from the client job and this parameter will keep the server sub-task active during this interval.

Command: WAIT=number

This command sets the maximum number of seconds for the server sub-tasks to wait for connections from the clients. The value can be between 0 and 99999 and has a default of 20 seconds.

The parameter is effectively passed down to the equivalent parameter within the server programs. The parameter serves as a safety net in case the server is dispatched and the request cannot be honored or is rejected by the server. This parameter also controls the effect of the WRITER= and READER= commands in that it will dictate how long a server started by these commands will remain running.

Command: CANCEL=number

This command cancels the server sub-task with the indicated ID. The ID can be found from a STATUS command to the started task. The cancelled sub-task will tidy up the environment and ABEND any client jobs that are currently connected. The device allocated to the server will also be released. Any pending connection will remain queued. Once the reason for the problem has been corrected, the sub-task can be restarted by either the READER= or WRITER= command.

Command: READER=dataset name

This command causes the dispatching of a read server sub-task to service reads from the indicated dataset. The normal connection protocol via the subsystem started task insists that the input dataset to the server sub-task be a GDG. This command enables reading from a non-GDG dataset.

The command is normally used to restart a failed read server. When the server sub-task starts, it will pick any pending connections from client jobs that need access to the required dataset. This command is also needed to dispatch servers for any client jobs that attempted connection prior to the subsystem started task commencing execution.

Command: WRITER=dataset name

This command causes the dispatching of a write server sub-task to service writes to the indicated dataset. The normal connection protocol via the subsystem started task insists that the output dataset to the server sub-task be a GDG. This command enables writing to a non-GDG dataset.

The command is normally used to restart a failed write server. When the server sub-task starts, it will pick any pending connections from client jobs that need access to the required dataset. This command is also needed to dispatch servers for any client jobs that attempted connection prior to the subsystem started task commencing execution.

Command: STATUS

This command reports the status of the started tasks and any server sub-tasks. For the server subtasks, the information reported includes the input or output dataset name, the current number of connections and the current I/O rate that it is delivering. Due to the way that the server programs processes, this information reflects the status over a 15 second interval.

Command: SUSPEND

This command will cause connection processing handled by the started task to be suspended. Any future connection requests will be queued and no new server sub-tasks will be dispatched. Although any existing server sub-tasks will continue to run, no new requests will be forwarded onto these servers by the subsystem started task. The effect of this command is reversed by the RELEASE command.

Command: RELEASE

This command reverses the effect of the SUSPEND command. Any pending connection requests are processed and any new server sub-tasks are dispatched to service these requests.

BMUXDSS

This program performs the function of running DFDSS. The program exploits the DFDSS user interface to enable it to intercept tape device I/O calls during dumps and restores. This is required as DFDSS does not directly support I/O to MVS subsystems.

The program monitors DFDSS functions If the functions call for DFDSS to dump or restore a DD statement that defines a subsystem connection, the DD is reallocated as a dummy dataset and sets up the I/O intercepts.

For dumps, the intercepts supports dumping to any combination of real device or subsystem. This means that duplexing of the dump data can be made to different server jobs.

If using the PARALLEL command within DFDSS, the SIZE parameter will need to be used together with an appropriately increased REGION size. If there is insufficient resource available to DFDSS, it will simply stall some of the tasks. This will not appear to be obvious from the DFDSS output, but may be inferred by the fact that there will be a large disparity in the server disconnect times reported by the server jobs.

Apart from the above, the program appears to function just like the ordinary DFDSS program. Because the program exploits the DFDSS user interface, it cannot be used within an environment that also needs to exploit the user interface. The program cannot, for example, be used under DFHSM as this product manages the devices and the tape volumes on behalf of DFDSS via this interface.

BMUXMANT

The BMUXMANT is used to perform maintenance functions on the server's datasets. It can be used to either perform analysis of the server datasets, cataloging of the client datasets or to make backup copies of the server datasets. The operation of the program can be modified by parameters (PARM=) to the program The program has two optional DD statements If the SYSPRINT DD statement is supplied, a report is produced on the contents of the input dataset (and output dataset if any). If the MUXOUT DD statement is supplied, the data will be copied across from the MUXIN DD statement.

The copy function can be used to copy multiple input server datasets into a single output dataset by using DISP=MOD. The internal client dataset names are modified during the copy process so that they are relative to the output server dataset name. This is done so that the client datasets within the copy are also accessible. While performing the copy, the copies of the client dataset can also be cataloged.

BMUXRDR/BMUXWRT

The BMUXRDR and BMUXWRT programs perform the read and write server functions, respectively. Each program requires only a single DD statement and their operations can be modified by parameters (PARM=) to the program. Each can either be run standalone in a standard piece of JCL or as a sub-task to the started task (BMUXSTC).

BMUXSTC

As previously discussed, the BMUXSTC program performs the function of the subsystem started task. The program itself does not require any DD statements. It does though perform dynamic allocation for tape devices on behalf of the server programs. The programs support a common set of commands (MVS Modify) or parameters (PARM=). The command interface only supports one command at a time. Although program parameter interface allows for multiple commands, several of the commands are meaningless in this context.

MESSAGES

The messages below not only document text messages that will be issued by the various programs, but the ABEND and return code that are passed between the various jobs. If a message results in an ABEND, the ABEND code will be U1097 and the reason code will be that of the message that caused the ABEND. Some of the messages are never actually issued, but only exist as return codes to other messages, mainly when errors are passed across the client server interface.

BMUX???UNDEFINED MESSAGE NO

A program has attempted issue the undefined message number ???. This is a logic error.

BMUX002%a ABEND:%B PSW:%c BASE:%d RETRY:%e

The program % has suffered an %b ABEND. The PSW (%c), the base address (%d) of the failing program and the address of the retry (%e) routine are reported.

The effected program will attempt recovery of the situation and attempt to clear the error. This may involve breaking a client to server job connection. There are times when the ABEND may repeat because the reason for the ABEND cannot be cleared. In this case, the program is designed to only repeat the check every 15 seconds. The program will continue processing. This may be as a result of a logic error, a bug, or some other event that occurred within the MVS system.

Consult the job logs from any associated client or server jobs as these may contain additional information about the ABEND. If the reason cannot be found, note the information in this message. Preserve the job log or the system log. Preserve job logs from any of associated client or server jobs.

BMUUX003

READJFCB OF DD i%ai FAILED RC=%b

The program has issued a RDJFCB system call on DD statement %a and has received a return code of %b. It is most likely that an incorrect DD name was quoted and there is no matching DD statement.

BMUX004 PROGRAM PARAMETER ERROR AT COL %a

A program has been passed an incorrect PARM string. The error has occurred at column %a in the string. Check the format of the parameter string and that the values supplied are valid for the program.

BMUX005 DATASET NAME i%ai TOO LONG

The dataset name (%a) the server is attempting to use is too long. This means that client jobs will not be able quote this name and a member name. Use a shorter name instead.

BMUX006 USING BSAM I/O

The server job has switched to using BSAM I/O rather than the default of EXCP I/O because of either a DCB or label override or because the data is on disk.

BMUX007 SUBSYSTEM i%ai NOT GENNED

The subsystem %a has either not been defined or has not initialized properly. Check the IEFSSNxx member in PARMLIB and check the system journal during the last IPL.

BMUX008 SERVER CONNECTION LIMIT REACHED

The limit (20) to the number of concurrent connections to one of the server programs has been reached. Any further connection requests by a client job to this server job will be queued awaiting the termination of an existing connection.

BMUX009 BUFFER GETMAIN FAILED AFTER %a BUFFERS

The program failed to obtain storage for the requested number of data buffers. As long as the number of buffers (%a) already created exceeds one, the program will continue. Review the region size for the job or started task.

BMUX010 FAILED TO LOAD BMUXAM RC=%a

The program BMUXLOAD has failed with a return code of %a when attempting to load the subsystem support module into CSA. The subsystem will not function without this module.

BMUX011 LX RESERVE FAILED RC=%A

The program BMUXLOAD has failed with a return code of %a when attempting to reserve a system linkage index. The subsystem will not function without this definition.

BMUX012 ETCON FAILED RC=%a

The program BMUXLOAD has failed with a return code of %a when attempting to connect its PC call definition to the system LX. The subsystem will not function without this connection.

BMUX013 BMUX SUBSYSTEM ACTIVE

The subsystem has initialized correctly

BMUX015 BMUX SUBSYSTEM DROPPED

The subsystem has been deactivated. A re-IPL is required to re-initialize the subsystem.

BMUX016 BMUX NOT IN IEFSSNXX

The entry in IEFSSNxx in PARMLIB does not quote the name BMUX as the subsystem name.

BMUX017 SUBSYSTEM ALREADY ACTIVE AT %a,%b

An attempt has been made to re-initialize the subsystem or another subsystem has initialized using the name BMUX. Correct the entry in IEFSSnxx.

BMUX020 DD:%a INVALID SUBSYSTEM PARAMETER

An incorrect parameter has been quoted as a parameter to the subsystem on the DD statement %a. Check the subparameters on the SUBSY parameter on the DD statement.

BMUX022 DD:%a OPEN FOR READ OR WRITE ONLY

The client program has attempted to open the subsystem interface for DD %a in a mode other than read or write. The application program is not suitable for use with the subsystem.

BMUX023 DD:%a INVALID I/O CALL %b

The client program has either attempted to PUT/WRITE to DD name %a which is open for input, a CET/READ from a DD name %a which is open for output, or perform a I/O function other than a get or a put. %b is the type of I/O being requested. The application program is either not suitable for use with the subsystem or contains a logic error.

BMUX024 DD:%a READ ERROR RC=%b BLOCK=%C DIAG=%D

The server has returned an error of %b to the last read request from a DD %a. The problem occurred when reading block %c. The DIAG field contains additional diagnostic information. This may be the result of a problem with the server job or a problem with the data for the requested member. Check the joblog of the server for errors. Also check the message with the same number as the return code.

BMUX025 DD:%a INVALID RECORD LENGTH=%b

The client program has either attempted to read or write a record of length %b to or from DD %a. The length of the record is either not equal to the LRECL when the RECFM defines fixed length records, or is larger than LRECL-4 for variable length records Check the DCB attributes on the DD statement.

BMUX026 DD:%a WRITE ERROR RC=%b BLOCK=%C DIAG=%D

The server has returned an error of %b to the last write request from a DD %a. The problem occurred when writing block %c. The DIAG field contains additional diagnostic information. This may be the result of a problem with the server job or a problem with the data for the requested member. Check the joblog of the server for errors. Also check the message with the same number as the return code.

BMUX027 DD:%a CONNECTION REJECTED RC=%b

The server has rejected the client connection attempt on DD statement %a with a return code of %b. This may be the result of a problem with the server job or with the parameters that were passed to the server. Check the joblog of the server for errors. Also check the message with the same number as the return code.

BMUX028 DD:%a SERVER ABORTED I/O RC=%b

The server job for DD %a has broken the connection to the server job with a return code of %b. This is most likely as a result of a problem with the server job. Check the joblog of the server for errors. Also check the message with the same number as the return code.

BNUX030 MEMBER:%a WROTE %b BLOCKS BUFGETS=%c

The client has closed off the write connection to member %a after writing %b blocks. During its connection it made %c requests from the server for a buffer. If %c exceeds %b by a large margin, it means that client is attempting to deliver data to the server faster than it can write it to the output device. The number of clients attached to the server and/or the number of buffers may need to be reviewed.

BMUX031 JOB %a.%b.%c WRITING TO MEMBER %d

The client job name %a, step name %b, DD name %c has established a connection writing to member %d.

BMUX032 I/O ERR: XXXXX

An I/O error has occurred when writing to the output file. XXXXX is the output of a SYNAD analysis of the error condition. The program will terminate and all client connections will be aborted.

BMUX033 OPEN WRITE FAILED RC=%a

The open of the output file failed with a return code of %a. Check the DD statement.

BMUX034 WRITE SERVER JOB ABENDED

The write server job has suffered an ABEND. This message mainly documents a return code passed from the server job to the client job. See the joblog of the server for further information.

BMUX035 CATALOG DATASET:%a FAILED RC=%b, %c

An attempt has been made to catalog a client's dataset (%a) and has failed with a return code of %b. The IDCAMS return code is given as %c. Processing will continue. Check that the server has security access to the client's dataset and that the dataset does not already exist.

BMUX036 SIOS=%a INTERRUPTS=%b TOTAL BLOCKS=%c

The server job has terminated and is reporting statistics on the number of times it started I/Os (%a), the number of times it dealt with I/O interrupts (%b), and the total number of blocks written (%c). If the number of started I/Os or interrupts starts to drop below the number of blocks transferred, this may indicate that the server is short of CPU time and is not being dispatched quickly enough. Review the dispatching priorities and the number of jobs running in the system.

BMUX040 MEMBER:%a READ%b BLOCKS BUFGETS=%c

The client has closed off the read connection to member ha after reading %b blocks. During its connection it made %c requests from the server for a buffer. If %c exceeds %b by a large margin, it means that client is attempting to get data from the server faster than it can read it from the input device. The number of clients attached to the server and/or the number of buffers may need reviewing.

BMUX041 JOB %a.%b.%c READING FROM MEMBER %d

The client job name %a, step name %b, DD name %c has established a connection reading from member %d.

BMUX042 I/O ERR: XXXXX

An I/O error has occurred when reading from the input file. XXXXX is the output of a SYNAD analysis of the error condition. The program will terminate and all client connections will be aborted.

BMUX043 OPEN READ FAILED RC=%a

The open of the input file failed with a return code of %a. Check the DD statement.

BMUX044 BLOCK %a WRONG LENGTH MEMBER:%b,%c

While reading the input file, block %a was found to be of the wrong length. The block appears to be number %c of member %b. Check the input file. It may be a result of genuine data corruption or from using DCB overrides when reading and/or writing to the input file.

BMUX045 MEMBER:%a SEQUENCE ERROR %b, %c

While reading the input file, the data for member %a was found to contain sequence errors. Block number %b was expected, but block %c was read. There is some kind of data corruption of the input file. The member may be lost, but check the other members for integrity. This problem is only reported when there is a client connected to the member.

BMUX046 READ SERVER JOB ABENDED

The read server job has suffered and ABEND. This message mainly documents a return code passed from the server job to the client job. See the job log of the server for further information.

BMUX047 LOCATE:%a FAILED RC=%b,%c

An attempt has been made to get the catalog information for a client dataset (%a) and has failed with a return code of %b. The IDCAMS return code is given as %c. Processing will continue and the read server program will default to performing a sequential scan of the input server dataset. Processing may take awhile. Check that the server has security access to the client's dataset and that the dataset does really exist.

BMUX048 MEMBER:%a INVALID CATALOG ENTRY

A client dataset (%a) catalog entry has been found and contains invalid information. Processing will continue and the read server program will default to performing a sequential scan of the input server dataset. Processing may take awhile. Check the catalog entry using IDCAMS LISTCAT. If the catalog entry is incorrect or corrupted and needs to be corrected, remove the entry using IDCAMS and then run the maintenance program to rebuild the catalog entries associated with the server dataset.

BMUX049 MEMBER:%a DUPLICATE SKIPPED AT %b:%c

While reading through the input server dataset, the start of member (-a) was encountered This member matches a pending connection, but is not an expected point on the input server dataset. Processing will continue and this occurrence of the member will be ignored. Duplicated members are tolerated on a single server dataset. If possible they should be avoided as it means that sequential scans for the start of the member will be unreliable.

BMUX050 FAILED TO FREE %a RC=%b

An attempt to unallocate DD %a has failed with a return code of %b. The BMUXDSS program has to reallocate the specified DD to as a "dummy" DD to circumvent limitations of DFDSS. Check out the return code against the DYNALOC system call.

BMUX051 FAILED TO ALLOCATE DD %a AS DUMMY RC=%b

The attempt to allocate DD %a as a "dummy" has failed with a return code of %b. The BMUXDSS program has to reallocate the specified DD to as a "dummy" DD to circumvent limitations of DFDSS. Check out the return code against the DYNALOC system call.

BMUX052 WARNING—%a IS A DUMMY DATASET

A dump or restore DD name is being directed to a dummy DD statement. This may be a result of attempting to reuse a DD statement within a single execution of the program BMUXDSS.

BMUX053 CONNECTED TO SERVER %a.%b

A connection has been made to the server running as job %a in step %b.

BMUX054 DD:%a CONNECTION REJECTED RC=%b

The server has rejected the client connection attempt on DD statement %a with a return code of %b. This may be the result of a problem with the server job or with the parameters that were passed to the server. Check the job log of the server for errors. Also check the message with the same number as the return code.

BMUX055 DD:%a DUMP ERROR RC=%b BLOCK=%c DIAG=%d

The server has returned an error of %b when dumping to DD %a. The problem occurred when writing block %c. The DIAG field contains additional diagnostic information. This may be the result of a problem with the server job or a problem with the data for the requested member. Check the job log of the server for errors. Also check the message with the same number as the return code.

BMUX056 DD:%a READ ERROR RC=%b BLOCK=%c DIAG=%d

The server has returned an error of %b when restoring from DD %a. The problem occurred when reading block %c. The DIAG field contains additional diagnostic information. This may be the result of a problem with the server job or a problem with the data for the requested member. Check the job log of the server for errors. Also check the message with the same number as the return code.

BMUX057 DD:%a SERVER ABORTED I/O RC=%b

The server job for DD %a has broken the connection to the server job with a return code of %b. This is most likely as a result of a problem with the server job. Check the job log of the server for errors. Also check the message with the same number as the return code.

BMUX060 CORRUPT RECORD HEADER

While unpacking the record from the block, the server was expecting a record header, but none was found. This may be as a result of actual data corruption or may be the result of DCB overrides on the server input file. This message mainly documents a return code passed from the server job to the client job. See the job log of the client for further information.

BMUX061 BUFFER TOO SMALL

The buffer in the client job is too small to receive the next record from the server. This probably is a result of using incorrect DCB parameters on the client DD statement. Review the DCB parameters. This message mainly documents a return code passed from the server job to the client job. See the joblog of the client for further information.

BMUX062 END OF SERVER DATA

The server has reached the end of its input file but the client has not yet terminated its connections. This is either a result of a corrupt input file to the server, a problem occurred whilst the data was originally being written or because no data blocks were found for the requested member. This message mainly documents a return code passed from the server job to the client job. See the joblog of the client for further information.

BMUX063 WRITE CONNECTION WAS ABORTED

The client has reached the end of file point for the member. This indicates that there was a problem when the data was originally written and that the client connection was broken during this process. This message mainly documents a return code passed from the server job to the client job. See the joblog of the client for further information.

BMUX064 MEMBER:%a NOT FOUND

An attempt was made to locate member %a within the server dataset. This normally occurs after a sequential scan for an uncataloged client dataset. The client connection request is aborted. If this occurs for a client dataset that is cataloged, check the catalog entry with IDCAMS LISTCAT. If the catalog entry is incorrect or corrupted and needs to be corrected, remove the entry using IDCAMS and then run the maintenance (BMUXMANT) program to rebuild the catalog entries associated with the server dataset.

BMUX065 CLIENT ABORTED CONNECTION

A client has initiated a connection to a server job and the server job has started to process the request, whilst the server job was completing the request, the client job was cancelled or failed for some reason. This message mainly documents a return code passed from the client job to the server job. See the joblog of the client for further information.

BMUX066 AUTHORIZATION FAILURE

The server job has performed a security authorization check of the client jobs access to the requested client dataset. The client job failed the check. This message mainly documents a return code passed from the server job to the client job. See the joblog of the client for further information

BMUX067 INVALID CONNECTION REQUEST

The started task has detected and rejected an invalid request from a client job. This message mainly documents a return code passed from the started task to the client job. See the joblog of the client for further information.

BMUX070 SIOS=%a INTERRUPTS=%b
SIPS=%c TOTAL BLOCKS=%d

The server job has terminated and is reporting statistics on the number of times it started I/OS (%a) the number of times it dealt with I/O interrupts (%b) and the total number of blocks read (%d). The number of skips (%c) indicates how many of the blocks read were discarded because they were not needed. If the number of started I/Os or interrupts starts to drop below the number of blocks transferred, this may indicate that the server is short of CPU time and is not being dispatched quickly enough. Review the dispatching properties and the number of jobs running in the system.

BMUX080 FAILED TO FREE %a RC=%b

The started task has attempted to release a device allocated to one of the server sub-tasks and it failed with a return code of %b. Processing will continue, but a device may be locked on to the started task. Stop and start the started task. Check out the return code against the DYNALOC system call.

BMUX081 STOP ACKNOWLEDGED %a SERVERS RUNNING

The started task has received a stop (P) commanded from the operator. There are currently %a server sub-tasks running. No new connection requests will be serviced and the existing server sub-tasks will be allowed to complete before the started task stops.

BMUX082 STATUS: %a %b SERVERS RUNNING
%c REQUEST PENDING

This messages reports the current status of the started task. The %a field indicates whether the started task is RUNNING normally or is HELD as a result of a SUSPEND command. There are %b server sub-tasks running and there are %c client jobs requests being queued within the starting task.

BMUX083 INVALID DATASET %a FROM JOB %b, %c

A request to launch a server sub-task to service the dataset %a by job %b, step %c has been rejected because the dataset name is invalid. Correct the requesting job.

BMUX084 DATASET: %a INVALID CATALOG ENTRY

A client dataset (%a) catalog entry has been found and contains invalid information. Processing will continue and a read server program will attempt to be dispatched for the highest generation of the associated server dataset. The read server program will perform a sequential scan of the input server dataset. Processing may take awhile. Check the catalog entry using IDCAMS LISTCAT. If the catalog entry is incorrect or corrupted and needs to be corrected, remove the entry using IDCAMS and then run the maintenance program to rebuild the catalog entries associated with the server dataset.

BMUX085 LOCATE: %a FAILED RC=%b,%c

An attempt has been made to get the catalog information for a server dataset (%a) and has failed with a return code of %b. The IDCAMS return code is given as %c. The client's request will be rejected by the started task and the client will be suspended awaiting a suitable server job being started. The started task will not handle all requests for a non-GDG server dataset. Either submit an ordinary server job to service the client's request or use the READER=/WRITER= commands to the started task.

BMUX086 JOB %a, %b. %c SERVER LIMIT REACHED

The started task has received a request from job %a, step %b, step %c and has been unable to start a new server sub-tasks because the server limit has been reached. The request is queued awaiting the ability to dispatch a new server sub-task. The started task has reached the limit set by the MAXSERV- command. The value of this command might need reviewing.

BMUX087 ATTACH SERVER FAILED RC=%a

The started task has attempted to dispatch a server sub-task and this has failed with a return code of %a. This will normally be accompanied by an ABEND message. The queued client requests for this server sub-tasks will be suspended. Correct the problem and either submit an ordinary server job to service the client's request or use the READER=/WRITER= commands to the started task.

BMUX088 #%a TYPE:%b DSN:%c
CONNECTS:%d I/O:%e KB/SEC

The message is output as a result of a STATUS command to the started tasks. It details the status of one of the active server sub-tasks being run under the control of the stated task. This status information is updated every 15 seconds by the server sub-task.

% is the task number of the sub-tasks and is required for the CANCEL= command to the started task. %b indicated whether it is a read or write server sub-task. %c is the name of the server dataset being serviced by this sub-task. %d is the number of active client connections to this server sub-task. %e is the effective data rate that the server sub-tasks is performing to its input or output dataset. On reads, this includes the data discarded because there is no client to receive some of the blocks.

BMUX089 COMMAND ERROR AT COL%a

The started task has received an operator command via the MVS modify (F) interface and there is an error at column %a. Check the format of the operator command or its acceptable values.

BMUX090 ALLOCATE OF %a FAILED RC=%b

The started task has failed in its attempt to allocate the server dataset prior to dispatching the server program. Check out the return code against the DYNALOC system call. The queued client requests for this server sub-tasks will be suspended. Correct the problem and either submit an ordinary server job to service the clients request or use the READER=/WRITER= commands to the started task.

BMUX100 SUBSYSTEM i%ai NOT INITIALIZED

The subsystem %a has either not been defined or has not initialized properly. Check the IEFSSNxx member in PARMLIB and check the system journal during the last IPL.

BMUX101 DD:%a CONNECTION SKIPPED

The client job has attempted to connect to or dispatch a server job under control of the started task. The request has been rejected but not failed. Correct the problem and either submit an ordinary server job to service the client's request or use the READER=/WRITER= commands to the started task.

BMUX110 INCOMPATIBLE BLOCKSIZES
FOR INPUT AND OUTPUT

The copy function of the maintenance (BMUXMANT) has been requested, but the block sizes or media format of the input and output DD statements are unequal. The block size of the input and output DD statements must be the same. There are limits to the ability to move data cartridge stored to other media. Try adjusting the BLKSIZE parameter on the DCB on the output dataset.

BMUX120 STARTED TASK ALREADY RUNNING

An attempt has been made to start the started task program (BMUXSTC) when a copy is already running on the system.

BMUX900 SMEM CALL PROBLEM

The client has attempted a cross memory call. This has been rejected because of an authorization or parameter error. This could be because the server has failed but has been unable to notify the client. This message mainly documents an ABEND reason. See the joblog of the server for further information.

BMUX901—UNKNOWN CALL

The subsystem has received an invalid call via the subsystem interface. The call is ignored.

BMUX902—COULD NOT FIND CB TO UNCHAIN

During unallocate processing, the subsystem attempted to unchain the CSA control block. It was not found in the chain. This is either a logic error or the result of another error. Processing continues.

As is readily apparent from the foregoing description, then, the present invention provides a general purpose method for interfacing with a storage device having a tape medium. The present invention still further provides a system capable of direct storage and retrieval of data to a storage device having a tape medium.

More specifically, the method and system of the present invention are capable of exploiting the increased speed and capacity of recently developed tape subsystems. By providing an extra level of data management when accessing tape, the method and system also solve the previously discussed problems associated with prior art tape storage methods and system. In contrast to such prior art, the method and system of the present invention are capable of interfacing with application programs and/or system utilities to provide direct storage and retrieval of data from such programs and/or utilities to and from a tape medium.

It is to be understood that the present invention has been described above in an illustrative manner and that the terminology which has been used is intended to be in the nature of words of description rather than of limitation. As previously stated, many modifications and variations of the present invention are possible in light of the above teachings. Therefore, it is also to be understood that, within the scope of the following claims, the invention may be practiced otherwise than as specifically described herein.

What is claimed is:

1. A method for interfacing with a storage device having a tape medium, the method comprising:

receiving data from a first source during a first time period;

creating a first data packet comprising at least a portion of the data from the first source;

receiving data from a second source during a second time period;

creating a second data packet comprising at least a portion of the data from the second source;

receiving additional data from the first source during a third time period;

creating a third data packet comprising at least a portion of the additional data from the first source;

transmitting the first data packet, the second data packet, and the third data packet to the storage device; and storing the first data packet, the second data packet, and the third data packet on the tape medium in an interleaved configuration, including:
  storing the first data packet at a first location on the tape medium;
  storing the third data packet at a second location on the tape medium adjacent to the first location, and
  storing the second data packet at a third location on the tape medium adjacent to the second location;
wherein said first data packet, second data packet, and third data packet are created and transmitted to the storage device without storage on an intermediate disk medium.

2. The method of claim 1 further comprising:
retrieving the first data packet from the tape medium; and
transmitting the retrieved first data packet to the first source.

3. The method of claim 1 wherein the first source comprises an application program.

4. The method of claim 1 wherein the first source comprises a system utility.

5. The method of claim 4 wherein the first source comprises a disk backup utility.

6. The method of claim 1 wherein the at least a portion of the data from the first source comprises a predetermined amount of data.

7. The method of claim 1 wherein creating a first data packet includes encoding the at least a portion of the data to identify the first source.

8. The method of claim 1 wherein the data from the first source, the data from the second source, and the additional data from the first source are received in a multiplexed fashion.

9. The method of claim 8 wherein the data from the first source, the data from the second source, and the additional data from the first source are received at a first rate and the first data packet, the second data packet, and the third data packet are transmitted at a second rate greater than the first rate.

10. A system for data storage, the system comprising:
a storage device having a tape medium; and
a control logic operative to:
  receive data from a first source during a first time period and create a first data packet comprising at least a portion of the data from the first source;
  receive data from a second source during a second time period and create a second data packet comprising at least a portion of the data from the second source;
  receive additional data from the first source during a third time period and create a third data packet comprising at least a portion of the additional data from the first source;
  transmit the first data packet the second data packet, and the third data packet to the storage device; and
  store the first data packet, the second data packet, and the third data packet on the tape medium in an interleaved configuration,
  wherein the control logic, to store the first data packet, the second data packet, and the third data packet on the tapes medium in an interleaved configuration, is operative to store:
    the first data packet at a first location on the tape medium;
    the third data packet at a second location on the tape medium adjacent to the first location, and
    the second data packet at a third location on the tape medium adjacent to the second location; and
wherein said first data packet second data packet and third data packet are created and transmitted to the storage device without storage on an intermediate disk medium.

11. The system of claim 10 wherein the control logic is further operative to retrieve the first data packet from the tape medium and to transmit the retrieved first data packet to the first source.

12. The system of claim 10 wherein the first source comprises an application program.

13. The system of claim 10 wherein the first source comprises a system utility.

14. The system of claim 13 wherein the system utility comprises a disk backup utility.

15. The system of claim 11 wherein the at least a portion of the data from the first source comprises a predetermined amount of data.

16. The system of claim 11 wherein the control logic, to create a first data packet, is operative to encode the at least a portion of the data to identify the first source.

17. The system of claim 11 wherein the control logic is further operative to receive the data from the first source, the data from the second source, and the additional data from the first source in a multiplexed fashion.

18. The system of claim 17 wherein the control logic is further operative to receive data from the first source, the data from the second source, and the additional data from the first source at a first rate and to transmit the first data packet, the second data packet, and the third data packet to the storage device at a second rate greater than the first rate.

* * * * *